United States Patent Office 2,836,628
Patented May 27, 1958

2,836,628

UNSATURATED BRANCHED-CHAIN ALCOHOLS AND METHODS OF PREPARING SAME

Robert E. Miller, Dayton, Ohio, assignor to Monsanto Chemical Company, St. Louis, Mo., a corporation of Delaware No Drawing. Application October 17, 1955
Serial No. 541,053

1 Claim. (Cl. 260—632)

This invention relates to certain branched-chain unsaturated aliphatic alcohols as new compositions of matter. The invention also relates to a method of preparing these alcohols.

This invention has as an object the production of new and useful compositions of matter. A further object is the production of branched-chain unsaturated aliphatic alcohols by an efficient process involving the condensation of unsaturated alcohols of lower molecular weight, many of these lower alcohols being readily available.

The Guerbet reaction for the condensation of alcohols is well known to the organic chemist. In the Guerbet reaction, a primary or secondary alcohol which contains a methylene group attached to the carbon atom of the carbinol group is condensed with itself (or with another alcohol of the class just described) to form as the principal product a higher alcohol containing double the number of carbon atoms of the starting alcohol.

However, the Guerbet reaction involves extensive heating and use of strong alkali, and it appeared that such treatment of an unsaturated alcohol of the required class could cause either cleavage of the molecule or polymerization. Moreover, according to the prevalent theory of this reaction, dehydrogenation and hydrogenation steps are involved as shown by the following equations:

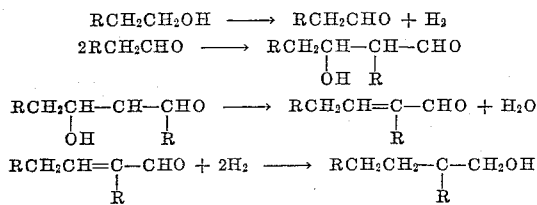

It would appear from the foregoing equations that if an unsaturated aliphatic alcohol containing a methylene group attached to the carbinol atom, such as

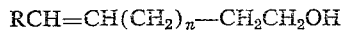

were used in a Guerbet type reaction, that the olefinic double bond would be hydrogenated or otherwise take part in the reaction.

However, it has now been discovered that unsaturated aliphatic alcohols containing a beta methylene group and containing no conjugated double bonds, may take part in a Guerbet type reaction to produce unsaturated branched-chain higher alcohols in good yield. To have the required methylene group adjacent to the carbinol carbon, it is necessary, of course, that no double bonds be attached to the beta carbon atom. While the alkenols are the preferred starting alcohols, the procedure can also be applied to alcohols of the required class, which further contain non-hydrocarbon group that do not prevent the desired reaction from occurring. The term "methylene group" as used herein is inclusive of "methyl group" which is a methylene group ($-CH_2-$) having one of the two valences satisfied by hydrogen.

The reaction can be applied generally to aliphatic alcohols containing non-conjugated olefin unsaturation and a methylene group attached by a single valence bond to the carbinol carbon atom. The lowest such members for which self-condensation is possible, are 3-butene-1-ol and 3-butene-2-ol. The reaction is applicable to both primary and secondary alcohols, so long as they contain at least one hydrogen attached to the carbinol carbon atom. Of course, if a secondary alcohol containing two beta methylene groups is condensed, a mixture of products will be obtained, which mixture can be used as such, or the individual alcohols can be separated by distillation. It is within the invention to apply the reaction to mixtures of alcohols, so long as one of the alcohols contains a non-conjugated olefinic double bond and a methylene group attached to the carbinol carbon atom; again, mixtures are obtained if both alcohols have methylene groups on their carbinol carbon atoms, and separation of the products may be necessary. The two alcohols to be condensed may differ only in unsaturation, as is the case, for example with stearyl and oleyl alcohols; in this case, the mixed product can be used, or the products can be separated by freezing one alcohol out of another, or by fractional crystallization from a solvent. Among the alcohols to which the process may be applied, the following are illustrative but not limiting examples: 3-butenol, 3-hexene-2-ol, 3-hexenol, erucylalcohol (14-docosenol), vinyl propyl alcohol (4-pentenol), 6-heptene-2-ol, 7-octenol, 9-decenol, citronellyl butyl alcohol (7,11-dimethyl-11-dodecenol), 14-pentadecenol, 13-pentadecenol, methyl geraniol (2,6-dimethyl-2,6-nonadien-8-ol), ethyl geranoil (2,6-dimethyl-2,6-decadiene-8-ol), 4-methyl-14-pentadecenol, 2,6,10-trimethyl-1,6-dodecadien-12-ol, citronellol, 10-undecenol, 10-undecene-2-ol, 2,6-dimethyl-2-dodecene-8-ol, oleyl alcohol, linoleyl alcohol, linolenyl alcohol, 16-tetracosenol, propenyl cyclohexyl carbinol and cyclohexyl-citronellol, i. e., (1'-hydroxy-3',7'-dimethyl-7-octenyl)-cyclohexane.

The reaction may be applied to mixtures of the above alcohols with each other, or to mixtures of any one of the above alcohols with another alcohol which does not contain olefinic unsaturation, or which does not contain a methylene group attached to the carbinol carbon atom, or which contains neither the unsaturation nor the stated methylene group; for example, the reaction may be applied to a mixture of stearyl and linolenyl alcohols, oleyl alcohol and cyclohexanol, hexadecanol and oleyl alcohol, allyl alcohol and 3-hexenol, 2-methyl-hexadecanol and linoleyl alcohol, oleyl alcohol and linolenyl alcohol, etc.

The reaction has been found particularly applicable to the condensation of high molecular weight alcohols, such as those in a range of 10 to 24 carbon atoms, to prepare unsaturated branched-chain alcohols of 20 to 48 carbon atoms. It has been found that these very high molecular weight alcohols may be obtained in good yields from high molecular weight alcohols, many of which are readily available. This procedure for the preparation of very high molecular weight alcohols has obvious advantages over other possible procedures such as those involving reduction of aldehydes, ketones, esters, etc., since these reduction procedures would require that the very high molecular weight branched-chain unsaturated aldehyde, ketone or ester be available; moreover, a selective reduction procedure would be necessary in order to avoid reduction of the olefin bond.

In the preparation of very high molecular weight alcohols by condensation of alcohols containing 10 or more carbon atoms, I have found that it is preferable to use a modified procedure in which a liquid which does not take part in the reaction and which has a boiling point of about 60 to 150° C. is included in the reaction mixture. This modified procedure is particularly applicable to the condensations of high molecular weight alcohols, as high molecular weight alcohols tend to be viscous and have high boiling points. The inclusion of the inert liquid gives an improved yield with fewer side reactions. It is presumed that the inert liquid improves results by aiding in agitation and removal of water from the reaction mixture. Any inert water-immiscible liquid having the required boiling point may be used, e. g., benzene, toluene, heptane, octane, nonane, etc., or other hydrocarbon or unreactive solvents. If such solvent is used, the amount may be varied considerably, as from any substantial amount, e. g., 2 percent by weight based upon the alcohol, to much larger amounts, e. g., 50 percent or more by weight of the reaction mixture. Small amounts such as 5 percent of the alcohol may be conveniently used. It is only necessary to add a suitable amount of solvent to obtain the desired reflux temperature; the reflux temperature is dependent upon the boiling points and relative amounts of the solvent and alcohol. Mixed solvents may be used, although it is not ordinarily necessary.

The condensation of these higher unsaturated alcohols produces a new class of chemical compounds, i. e., aliphatic alcohols containing at least one olefinic double bond and containing 20 to 48 carbon atoms, and having long chains branched at the 2-carbon atom. It is apparent that this branched-chain structure will give some unique properties, as can be seen from the fact that the very high molecular weight 36-carbon alcohols of the invention are liquids, although straight chain alcohols become solids around 20 to 24 carbon atoms.

The alcohols of the present invention, because of their unsaturated character are useful as stabilizers for plastics; for example 2-(7',10'-hexadecadienyl)-11,14-eicosadienol, and 2-(7-hexadecenyl)-11-eicosenol were subjected to standard tests as light stabilizers for polyvinyl chloride and gave stability up to 300 hours under ultraviolet light; and 2-(7',10',13' - hexadecatrienyl) - 11,14,17-eicosatrienol when subjected to milling tests with polyvinyl chloride proved to be a fair heat stabilizer. The alcohols are useful as miticides, e. g., 2-(7'-10'-hexadecadienyl)-11,14-eicosadienol gave a good kill of the two-spotted spider mite ("*Tetranychus bimaculatus*") when infested plants were dipped in a 2 percent aqueous emulsion of the compound. 2 - (1',5' - dimethyl-5'-hexenyl) - 5,9 - dimethyl - 9 - decene - 1 - ol is a good insect repellent. The alcohols are intermediates in the preparation of waxes, surfactants; cosmetic cream additives, textile finishing agents, pharmaceuticals and agricultural toxicants. The olefin bonds of the alcohols could be used for all the substitution reactions of olefins, e. g., to prepare long chain glycols; such glycols could be reacted with diisocyanates to prepare coating resins. Moreover, the olefin bonds could be subjected to hydrogenation preferably after the condensation procedure, to prepare the saturated alcohols.

The new alcohols of my invention conform to the general formula:

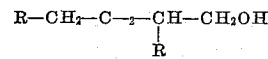

in which R and R' are aliphatic radicals, at least one of them containing at least one non-conjugated olefinic double bond, and R" and R''' are hydrogen or aliphatic hydrocarbon radicals. In order to insure the degree of branching and the resulting properties characteristic of the compounds, it is necessary that each of R and R' contain at least 8 carbon atoms. However, as is apparent from the formula, the position of R" differs from that of R by only a methylene group, so that in some cases an R" of 9 or more carbon atoms is equivalent to the R of 8 or more carbon atoms. R, R', R" and R''' may have straight, cycloaliphatic or branched-chain structures. If a low degree of unsaturation in a large molecule is desired, only one of R and R' should contain unsaturation. However, if it is desired to have several reactive positions separated by long chains, both R and R' should contain olefinic bonds. It is preferred that R and R' differ only in the degree of unsaturation; or that they be equal, and further, that R" and R''' be hydrogen, as is the case when primary alcohols are condensed to give alcohols of the formula:

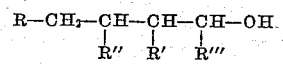

in which R is a hydrocarbon radical of 8 to 22 carbon atoms containing non-conjugated olefinic unsaturation. Alcohols of this latter general formula are characterized by being branched at the 2-carbon atom, the two long-chain unsaturated branches differing only by the ethylene group which is interposed in the longer branch between the beta carbon atom of the alcohol and the rest of the longer branch; this group of alcohols may be considered as butanols di-substituted on the 2- and 4-carbon atoms by a monovalent hydrocarbon radical which contains at least one non-conjugated olefinic double bond.

Illustrative but not limiting examples of the new compounds of my invention are the following: 2-(12'-eicosenyl) - 16 - tetracosenol, 2 - (7' - octenyl) - 11-dodecenol, 2 - (5',9'-decadienyl) - 9,13-tetradecadienol, 2 - (12' - tridecenyl) - 16 - heptadecenol, 2 - (11' - tridecenyl) - 15 - heptadecenol, 2 - (2' - methyl - 12'-tridecenyl) - 6 - methyl - 16 - heptadecenol, 2 - (9',5',1'-trimethyl - 10', 5' - decadienyl) - 5,9,11 - trimethyl-9,14-tetradecadienol, 2 - (1',5' - dimethyl - 5' - hexenyl)-5,9-dimethyl - 9 - decenol, 2 - (8' - nonenyl - 12 - tridecenol, 2 - (7' - hexadecenyl) - 11 - eicosenol, 2 - (7',10',13'-hexadecatrienyl) - 11,14,17 - eicosatrienol, 2 - (7',10'-hexadecadienyl) - 11,14 - eicosadienol, 6 - (1',5' - dimethyl - 4' - hexenyl) - 9,13 - dimethyl - 7 - butyl - 12-tetradecene - 5 - ol, 2 - (7' - hexadecenyl) - eicosanol, 2-hexadecyl-11-eicosenol, mixtures of the latter two alcohols, 2-(7'-hexadecenyl)-octadecanol, 2-(7',10',13'-hexadecatrienyl) - 11 - eicosenol, 2 - (7' - hexadecenyl)-11,14,17-eicosatrienol, mixtures of the latter two alcohols, 1,3 - dicyclohexyl - 2 - (1',5' - dimethyl - 5' - hexenyl)-dimethyl - 9 - decene - 1 - ol, 2 - (2' - butyloctyl)-9,12-octadecadiene - 1 - ol, and 2 - (2' - ethylhexyl)-9,12,15-octadecatriene-1-ol.

The reaction is usually run in conventional laboratory apparatus. The reactions at atmospheric pressure were carried out in a 1-liter round-bottom flask, equipped with a mechanical stirrer, thermometer and an electrically heated fractionation column to which was attached a Dean-Stark water removal trap and a condenser. When the reaction is conducted under pressure, there is used a bottom-stirred autoclave above which is mounted a 3-foot fractionation column topped by a 3-foot tube condenser; a water trap is interposed between the condenser and column.

The following examples illustrate certain embodiments of the invention, but the details of the procedures may be varied as understood by workers in the art.

Example 1

A one liter flask was charged with 500 grams of linoleyl alcohol, 40 cc. of toluene, 23.6 grams of tripotassium phosphate and 4.0 grams of 1:1 nickel-copper chromite dehydrogenation catalyst. The mixture was stirred and refluxed at 246-250° C. under atmospheric pressure for 6.5 hours, during which 16.5 ml. of water was removed azeotropically. The mixture was cooled, filtered to remove the catalyst and distilled. An alcohol product (217 grams) of boiling point 278-291° C./3-4 mm. was obtained, having a refractive index of $n_D^{25}=1.4671$. The conversion to 2-(7',10'-hexadecadienyl)-11,14-eicosadien-1-ol based upon linoleyl alcohol charged is 45.2% and the yield based upon linoleyl alcohol reacted is 53.8%.

Example 2

A mixture of 499.5 grams of linolenyl alcohol (9,12,15-octadecatrienol), 26.5 grams of tripotassium phosphate, 10.1 grams of 1:1 copper chromite-nickel catalyst and 50 cc. of toluene was refluxed and stirred at 191–196° C. for 12 hours. The water removed amounted to 12.1 cc. The product upon distillation gave a fraction of 31.5 grams of boiling point of 309–311° C./4.0 mm., and a refractive index of $n_D^{25}=1.4779$ and a density of $d_4^{20}=0.861$. This viscose liquid fraction exhibited strong hydroxylic and olefinic infrared absorption bands. The analysis in conjunction with the infrared data confirms the structure 2-(7,10,13-hexadecatrienyl)-11,14,17-eicosatriene-1-ol.

*Analysis.*—Calcd. for $C_{36}H_{62}O$: C, 84.45; H, 12.22. Found: C, 84.30; H, 12.69.

Example 3

A round bottom flask was charged with 402.5 grams of oleyl alcohol (cis-9-octadecen-1-ol), 26.5 grams of a 1:1 copper chromite-nickel catalyst and 30.0 cc. of toluene. The material was refluxed at atmospheric pressure for 12 hours during which 11 cc. of water was removed. Distillation gave the following fractions.

(1) 77.5 grams, B. P. up to 155° C./4.8 mm. which infrared indicates is a non-conjugated diene.
(2) 18.5 grams, B. P. 160–221° C./4 mm., largely recovered oleyl alcohol.
(3) 10.0 grams, B. P. 221–270° C./4 mm.
(4) 211.0 grams, B. P. 270–290° C./2.5–2.8 mm., $n_D^{25}$ 1.4669, $d_4^{20}$ 0.846.

Infrared analysis shows that fraction 4 is the alcohol. The conversion to 2-(7′-hexadecenyl)-11-eicosene-1-ol is 54.5% and the yield is 57.0%.

Example 4

3,7-dimethyl-7-octenol (320 grams), 26.5 grams of tripotassium phosphate, 4.0 grams of 1:1 nickel-copper chromite dehydrogenation catalyst and 30 cc. of benzene were refluxed and stirred for 8 hours at 152–166° C. The mixture was filtered and distilled to give 43.5 grams of 2-(1′,5′-dimethyl-5′-hexenyl)-5,9-dimethyl-9-decene-1-ol. The conversion was 13.7% and the yield was 45.2%. The liquid product had a refractive index, $n_D^{25}=1.4743$ and a density, $d_4^{20}=0.879$.

Example 5

Linolenyl alcohol was condensed with 2-ethylhexanol using 260 grams of linolenyl alcohol and 300 grams of 2-ethylhexanol in the presence of 25.5 grams of tripotassium phosphate, 4.0 grams of 1:1 copper chromite-nickel catalyst and 20 cc. of toluene. The reaction was conducted under atmospheric pressure at 178° C. for 14 hours. A fraction of 2-(2′-ethylhexyl)-9,12,15-octadecatrienol of boiling point 235–250° C./4 mm. was separated. The yield was 17.2% and the conversion was 6.3%.

Example 6

2-butyloctanol, 360 grams (1.9 mole), linoleyl alcohol, 270 grams (1.0 mole), 26.5 grams of tripotassium phosphate, 30 cc. of benzene and 5.2 grams of copper chromite-nickel catalyst were refluxed and stirred for 12 hours at 168–185° C. A 5.9% conversion and 17.3% yield of 2-(2′-butyloctyl)-9,12-octadecadienol was obtained.

*Analysis.*—Calcd. for $C_{30}H_{58}O$: C, 82.99; H, 13.40. Found: C, 83.11; H, 13.36.

The classical catalyst for the Guerbet reaction is sodium metal employed in the form of its alcoholate. However, a wide variety of other inorganic basic substances are known to be effective. By way of example, but not limitation, the following inorganic basic substances can be used:

Tripotassium phosphate
Sodium hydroxide
Potassium hydroxide
Calcium oxide
Potassium bicarbonate
Sodium carbonate
Magnesium carbonate
Magnesium oxide
Sodium metaborate
Potassium ethoxide
Sodamide
Sodium acetate
Sodium propionate
Tricalcium phosphate
Potassium butoxide
Magnesium trisilicate
Potassium acid phosphate ($K_2HPO_4$)
Potassium pyrophosphate ($K_4P_2O_7$)
Sodium metasilicate
Sodium orthosilicate.

Salts of organic acids are considered as inorganic basic substances in the sense of the present application.

Along with the inorganic basic substance, it is preferred to use a dehydrogenation catalyst. Any known dehydrogenation catalyst may be used, although some will be superior to others. I generally prefer to employ metal and metal oxide dehydrogenation catalysts, especially nickel, copper, chromium, zinc, tin, silver, cadmium, manganese, cobalt and their oxides and mixed salts. By way of example, but not limitation, the following dehydrogenation catalysts can be used; metallic nickel such as Raney nickel, nickel on kieselguhr, etc., copper chromite; physical mixtures of cobalt and copper; metallic copper; mixtures of a basic oxide, such as calcium oxide, magnesium oxide, or beryllium oxide, and a metal oxide such as copper oxide, with or without smaller percentages of $SiO_2$, $Fe_2O_3$ or $Al_2O_3$; noble metals such as platinum and palladium.

The form of my catalyst or catalysts will be somewhat dependent upon the reaction system. The basic substance and the dehydrogenation catalyst can be separately added, and maintained in suspension in a liquid reaction mixture. When the reaction is carried out in the vapor phase, the alcohol reactant or reactants can be vaporized and passed over a mass of particles of the basic substance, or particles composed of an intimate mixture of the basic substance and the dehydrogenation catalyst. In many cases it is preferred to support my catalyst on an inert carrier such as alumina, calcined silica, activated carbon, pumice and the like. Or a dehydrogenation catalyst can be supported on a basic substance which acts as a particulate support and at the same time as the basic component of the catalyst, for example metallic nickel deposited on particles of calcium oxide. The components of my catalysts are employed in small but catalytic amounts. For instance, the basic substance can be present in an amount ranging from 1 to 20 parts by weight per 100 parts by weight of alcohols, and the dehydrogenation catalyst can be present in similar amounts if it is used at all; from 1 to 5 parts by weight of the dehydrogenation catalyst per 100 parts by weight of alcohols is usually suitable.

The reaction temperature may vary considerably, depending to some extent on the particular alcohol subjected to the process, and also on the reaction conditions and the desirability of a short reaction time as well as good conversion. In general, other conditions being equal, the higher the temperature, the shorter the reaction time for optimum results. In general, temperatures of 150° C. or higher are desirable. However, temperatures from 125 to 300° C. have been found satisfactory. A convenient way of carrying out the reaction is by maintaining a batch of the alcohol containing the catalyst and an inert water-immiscible solvent under reflux at atmospheric pressure. The materials can also be refluxed under autogenous pressure. Or, gases such as hydrogen or nitrogen may be used to increase the pressure. However, no particular advantage results from the use of pressure, and hydrogen gas in the presence of the metallic catalysts will hydrogenate the olefinic bonds, making the use of hydrogen gas inadvisable unless a saturated product is desired.

The reaction time chosen will be dependent on the particular alcohol reactant or reactants, the catalyst, the temperature, the use of liquid or vapor phase conditions, and other reaction conditions. From 3 to 15 hours is frequently a desirable reaction time for batch reactions. Ordinarily, the reaction time required for a continuous flow-type of reaction system is considerably less than that required for a batch reaction.

The Guerbet reaction is well known to the organic chemist, and other Guerbet catalysts than those named may be used, and the catalysts and reaction conditions may be varied as understood by the workers in the art.

However, for the particular type of alcohols here involved, and for the chosen reaction conditions, nickel-copper chromite has been found especially satisfactory as the dehydrogenation catalyst.

While the present process is generally directed to condensing two molecules of alcohol together, it should be appreciated that some trimer or higher condensates are usually formed, and greater amounts of such condensates can be produced by the use of higher temperatures or longer heating times; for example, the condensation of diolelyl alcohol with oleyl alcohol produces a 54-carbon atom alcohol. It should also be appreciated that the Guerbet reaction conditions may cause a certain amount of shifting of the position of double bonds, and may cause some conversion of geometric isomers to their geometrical isomerides, for example, the starting oleyl (cis) form may sometimes appear as the elaidyl (trans) form in the product.

A new class of branched-chain unsaturated higher alcohols has been described. A convenient, efficient method of condensing unsaturated alcohols to unsaturated higher alcohols has also been described. While the foregoing examples illustrate certain embodiments, the materials and details may be varied as understood by those skilled in the art.

I claim:

As a new compound, 2-(1',5'-dimethyl-5'-hexenyl)-5,9-dimethyl-9-decene-1-ol.

References Cited in the file of this patent
UNITED STATES PATENTS

| | | |
|---|---|---|
| 2,457,866 | Carter | Jan. 4, 1949 |

FOREIGN PATENTS

| | | |
|---|---|---|
| 884,829 | France | May 8, 1943 |